United States Patent [19]

Kaniut

[11] 4,037,808
[45] July 26, 1977

[54] TRAVELLING TAIL-UNIT WITH CIRCULAR ARC MOTION

[76] Inventor: Herbert Kaniut, Orrerweg 33/35, 5000 Cologne 71, Germany

[21] Appl. No.: 659,140

[22] Filed: Feb. 18, 1976

Related U.S. Application Data

[63] Continuation-in-part of Ser. No. 508,319, Dec. 4, 1974, abandoned.

[30] Foreign Application Priority Data

Aug. 16, 1974 Germany .............................. 2439479

[51] Int. Cl.² .......................... B64D 33/02; B64C 5/10
[52] U.S. Cl. ..................................... 244/53 B; 244/89
[58] Field of Search ................... 244/13, 15, 43, 45 R, 244/45 A, 87, 89, 48, 46, 55, 54, 58, 53 B; D12/71, 76

[56] References Cited

U.S. PATENT DOCUMENTS

| | | | |
|---|---|---|---|
| 1,916,813 | 7/1933 | Sessa | 244/46 |
| 2,376,636 | 5/1945 | Thompson | 244/43 |
| 2,941,752 | 6/1960 | Gluhareff | 244/46 |
| 3,181,820 | 5/1965 | Burnelli | 244/87 |
| 3,447,761 | 6/1969 | Whitener et al. | 244/55 |
| 3,454,239 | 7/1969 | Frey | 244/87 X |
| 3,469,803 | 9/1969 | Schmielau | 244/55 |
| 3,493,197 | 2/1970 | Spearman | 244/87 |
| 3,936,017 | 2/1976 | Blythe | 244/55 |

Primary Examiner—Trygve M. Blix
Assistant Examiner—Galen L. Barefoot

[57] ABSTRACT

Aircraft having subsonic and supersonic flight capabilities which utilize travelling tail units with circular arc motions, connected with the rear fuselage by means of two arm-frames that swing upward and rearward and vice versa, to generally increase stability and control of aircraft during low-speed flight and to reduce accidents at zero altitude operations.

17 Claims, 14 Drawing Figures

_4,037,808_

TRAVELLING TAIL-UNIT WITH CIRCULAR ARC MOTION

This is a continuation-in-part application of Ser. No. 508,319 filed Dec. 4, 1974, now abandoned.

BACKGROUND OF THE INVENTION

This invention relates generally to aerial vehicles, and relates with particularity to subsonic and supersonic aircraft having an increased airworthiness at low-speed flight with the advantage of a better control for takeoff and landing operations, and having a reduced high-speed flight air resistance enabling a better utilization of propulsion energy. One of the major problems associated with the design of modern fast aircraft is to provide means ensuring satisfactory lift, stability, and control of aircraft, not only at high-speed flight, but also at low-speed flight. In this respect the lift increasing means have passed an encouraging progress, but new means for improving stability and control at low-speed flight have less often been proposed. Thus it is obvious that the present great flight speed differences between the cruising speeds and the landing speeds are at variance with the applied conventional stability and control means whose serviceableness is inadequate, and that time has come to introduce new stability and control means in order to meet the present low-speed flight requirements and to provide some safety reserves for future developments.

A method of improving the conventional stability and control means, as contemplated by the present invention, involves a lengthwise travelling tail unit with circular arc motions, which increases the airworthiness of aircraft during low-speed flight and particularly at zero altitude operations.

Accordingly, it is an object of the present invention to provide new and improved stability and control means for modern fast aircraft.

Another object of the present invention is to provide new and improved stability and control means with reduced air resistance to save propulsion energy.

Another object of the present invention is to provide a new and improved variable geometry tail unit with high reliability of operation.

Another object of the present invention is to provide a new lightweight variable geometry tail unit.

Another object of the present invention is to provide a new variable geometry tail unit for subsonic or transsonic aircraft.

Another object of the present invention is to provide a new and improved variable geometry tail unit for supersonic aircraft.

Another object of the present invention is to provide a new and improved variable geometry tail unit for aircraft with variable geometry wings.

According to the present invention, the foregoing objects are attained by providing in powered aircraft travelling tail units with circular arc motions. The travelling tail unit consists of a tail unit-chassis with a longitudinal and airflow suitable shape and of the tail surfaces, attached to said chassis, which parts form a common monocoque construction. The said tail unit is connected with the aft end of the aircraft fuselage by means of four swivel arms, which are assemblied into a front swivel arm-frame and a hind swivel arm-frame. Both swivel arm-frames have hinges on their corners connecting them on their lower corners with said aft end of the fuselage and on their upper corners with said tail unit-chassis. By swivelling motions of said arm-frames the tail unit is moved upwards and rearwards - increasing the effective tail unit lever - for low-speed flight, or is moved forwards and downwards for high-speed flight, in which forward position the tail unit-chassis is joined in an airflow suitable manner to said aft end of said fuselage.

Within a first embodiment of the travelling tail unit are included further features which place said tail unit in its forward high-speed flight position in a horizontal distance behind the trailing edge of the aircraft wing. From this forward position the said tail unit is moved rearwards for low-speed flight and vice versa.

The travelling tail surfaces may have smaller dimensions than fixed tail surfaces of conventional aircraft because the increased effective tail unit-lever during low-speed flight provides for balancing of moments. This reduces the air resistance during high-speed flight and saves propulsion energy.

In a second embodiment of the travelling tail unit, substantially provided for supersonic aircraft, the horizontal tail in its forward high-speed flight position is placed in a plane lying above the planes of the wings, and is so much moved forwards that the leading edges of said horizontal tail are positioned in front of the trailing edges of said wings. This reduces the supersonic impact wave resistance of the aerodynamically cooperating wings and horizontal tail on the basis of the Area Rule, and saves propulsion energy.

According to the present invention and on the basis of the foregoing two embodiments, three principal aircraft designs are provided. A first subsonic or transsonic aircraft design having fixed wings, a fuselage with jet engines placed on its aft end, and a travelling tail unit consisting of a tail unit-chassis and two inclined tail surfaces in V-tail arrangement. The rearward and forward travelling motions of the tail unit are accomplished by two swivel arm-frames, which also connect the tail unit-chassis with the aft end of the fuselage. In the forward high-speed flight position the tail unit is placed in a horizontal distance behind the trailing edges of the wings, from which forward position the tail unit is moved rearwards for low-speed flight and vice versa. The tail unit-chassis is also used as an airflow suitable fairing for an additional startbooster jet engine, which during high-speed flight is stopped and covered by the tail unit-chassis, but which during low-speed flight is uncovered and put into operation, and which increases the takeoff thrust of the zoom away thrust of the aircraft.

A second supersonic aircraft design having fixed wings with jet engines placed on their bottom sides, a fuselage, and a travelling tail unit consisting of a tail unit-chassis, a vertical tail, and a horizontal tail. The rearward and forward travelling motions of the tail unit are accomplished by two swivel arm-frames, which also connect the tail unit-chassis with the aft end of the fuselage. In the forward high-speed flight position the tail unit is placed in a horizontal distance behind the trailing edges of the wings, from which forward position the tail unit is moved rearwards for low-speed flight and vice versa. The tail unit-chassis is also used as an airflow suitable fairing for an additional startbooster jet engine, which during high-speed flight is stopped and covered by the tail unit-chassis, but which during low-speed flight is uncovered and put into operation, and which increases the takeoff thrust or the zoom away thrust of the aircraft.

The provision of startbooster jet engines specially adapted to zero altitude conditions is favourable for each high-altitude aircraft. It gives a better combustion efficiency connected with fuel savings and cleaner exhaust emissions on the airfields, and increases the propulsion redundancy. This is particularly valid for supersonic aircraft, whose main jet engines can be of simpler design, what in turn balances the costs of the startbooster engine.

A third supersonic aircraft design having variable geometry wings or fixed wings, a fuselage with jet engines in its aft end, and a travelling tail unit consisting of a tail unit-chassis, a vertical tail, and a horizontal tail. The rearward and forward travelling motions of the tail unit are accomplished by two swivel arm-frames, which also connect the tail unit-chassis with the aft end of the fuselage. In the forward high-speed flight position the horizontal tail is placed in a plane lying above the planes of the wings, and the leading edges of the horizontal tail are positioned in front of the trailing edges of the rearwards swung variable geometry wings or in front of the trailing edges of the fixed wings.

The swinging wings are connected with the travelling tail unit by means of special rods, what reduces the common motion forces for both devices. That is because the motions of the wings and the tail unit are always differently directed, with the air stream and against the air stream, and by said connection the air resistance forces on both devices are acting against themselves.

BRIEF DESCRIPTION OF THE DRAWINGS

A more complete appreciation of the invention and many of the attendant advantages thereof will be readily apparent by reference to the following detailed description when considered in connection with the accompanying drawings wherein:

FIG. 1; FIG. 2 and FIG. 3 show a subsonic or transsonic aircraft. FIG. 1 is the upper plan view, and FIG. 2 the side elevational view of the aircraft, while FIG. 3 is the rear view of the aft end of the aircraft. The left side of FIG. 1, the FIG. 2, and FIG. 3 illustrate the travelling tail unit in its forward high-speed flight position, whereas the right side of FIG. 1 illustrates the travelling tail unit in its rearward low-speed flight position. In FIG. 1 and FIG. 2 the dash lines show the respective different positions of the travelling tail unit.

FIG. 4; FIG. 5 and FIG. 6 show a supersonic aircraft. FIG. 4 is the upper plan view, and FIG. 5 the side elevational view of the aircraft, while FIG. 6 is the rear view of the aft end of the aircraft. The left side of FIG. 4, the FIG. 5, and FIG. 6 illustrate the travelling tail unit in its forward high-speed flight position, whereas the right side of FIG. 4 illustrates the travelling tail unit in its rearward low-speed flight position. In FIG. 4 and FIG. 5 the dash lines show the respective different positions of the travelling tail unit.

FIG. 13 and FIG. 14 show a supersonic aircraft having variable geometry wings. FIG. 13 is the upper plan view, and FIG. 14 the side elevational view of the aircraft. The left side of FIG. 13 and FIG. 14 illustrate te travelling tail unit in its forward high-speed flight position, whereas the right side of FIG. 13 illustrates the travelling tail unit in its rearward low-speed flight position. In both figures he dash lines show the respective different positions of the travelling tail unit, whilst in FIG. 13 also the variable geometry wings are shown in their positions which correspond with the travelling tail unit.

DETAILED DESCRIPTION AND OPERATION

Figures 1, 2, 3:
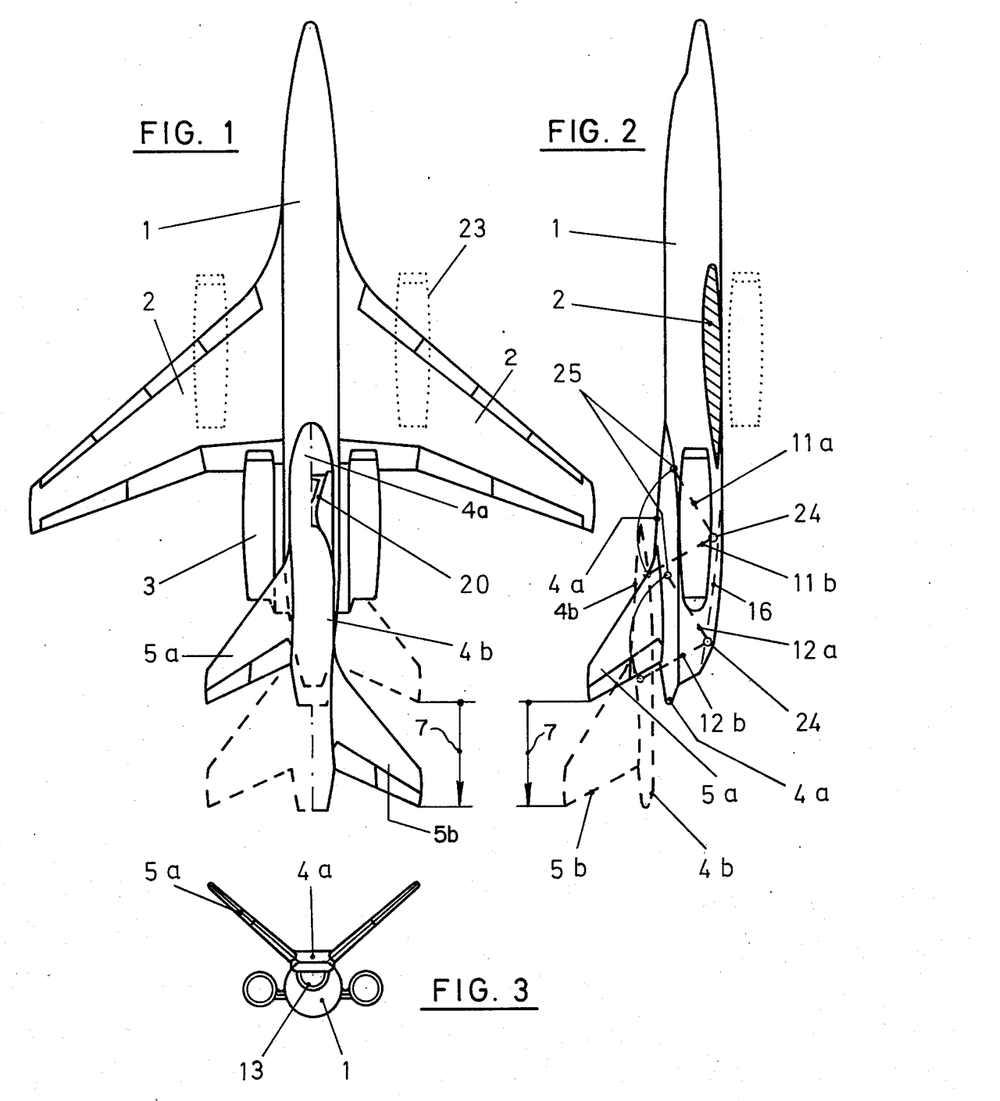
Figures 4, 5, 6:
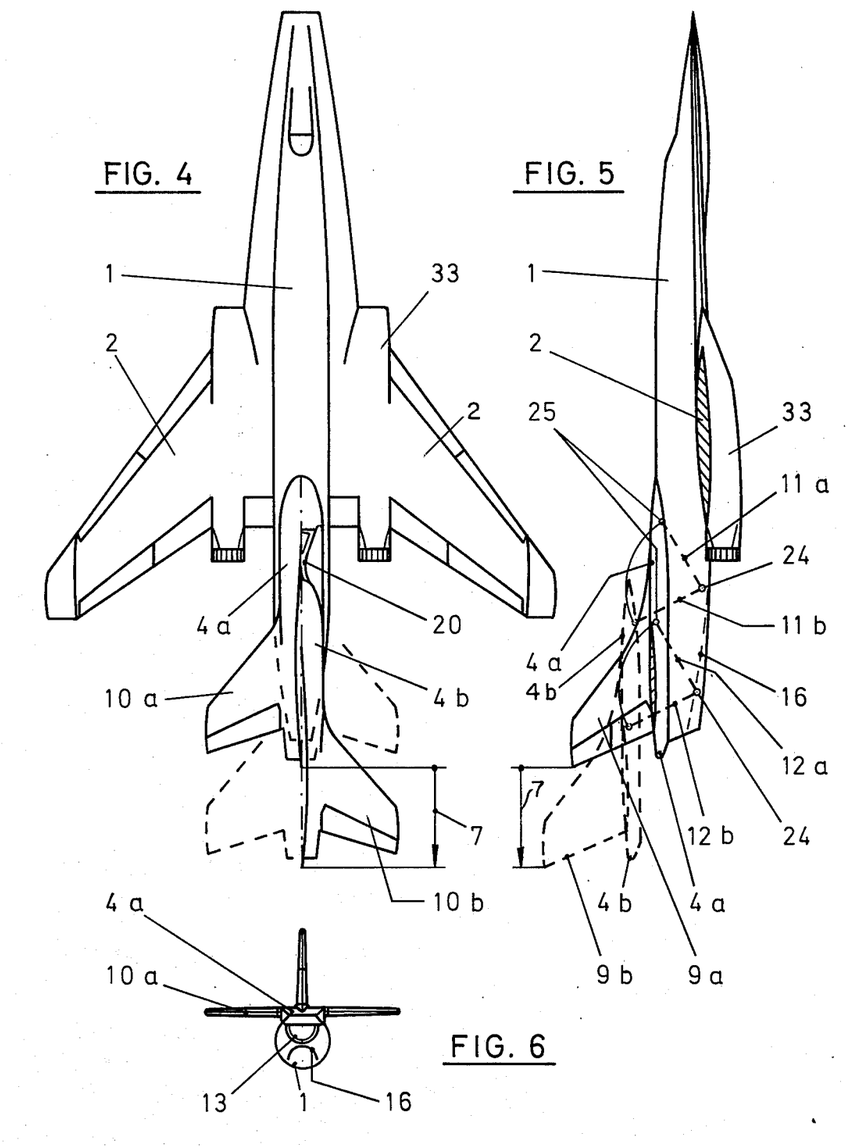

Referring now more particularly to the drawings wherein like reference numerals designate identical parts in each of the views, and more particularly to FIG. 1; FIG. 2; FIG. 3; FIG. 4; FIG. 5; and FIG. 6, there are:
1. fuselage;
2. fixed wings;
3. jet engines;
4. tail unit-chassis
4a. tail unit-chassis in its forward high-speed flight position
4b. 1 tail unit-chassis in its rearward low-speed flight position;
5a. two inclined tail surfaces in V-tail arrangement, in their foward high-speed flight position;
5b. two inclined tail surfaces in V-tail arrangement, in their rearward low-speed flight position;
7. stroke of the tail unit motion;
9. vertical tail;
9a. vertical tail in its forward high-speed flight position;
9b. vertical tail in its rearward low-speed flight position;
10. horizontal tail;
10a. horizontal tail in its forward high-speed flight position;
10b. horizontal tail in its rearward low-speed flight position;
11. front swivel arms;
11a. front swivel arms in their forward high-speed flight position;
11b. front swivel arms in their rearward low-speed flight position;
12. hind swivel arms;
12a. hind swivel arms in their forward high-speed flight position;
12b. hind swivel arms in their rearward low-speed flight position;
13. startbooster jet engine;
16. channel in the rear bottom side of the fuselage;
20. cross-bond;

23. optional position of jet engines;
24. lower hinges of the swivel arms or of the swivel arm-frames;
25. upper hinges of the swivel arms or of the swivel arm-frames;
33. jet engines.

The travelling tail unit consists of the tail unit-chassis 4a; 4b and two inclined tail surfaces 5a; 5b in V-tail arrangement, or of the tail unit-chassis 4a; 4b, the vertical tail 9a; 9b, and the horizontal tail 10a; 10b, which parts of each tail unit form a common monocoque construction. The tail unit-chassis is connected with the aft end of the fuselage by means of two front swivel arms 11, with the positions 11a and 11b, and two hind swivel arms 12, with the positions 12a and 12b; whilst the two front swivel arms are connected into a front swivel arm-frame, and the two hind swivel arms into a hind swivel arm-frame. For low-speed flight and particularly for takeoff and landing operations the tail unit-chassis with the tail surfaces is moved along he path of a circular arc upwards and rearwards into the rearward position 4b; 5b or 4b; 9b; 10b, which is coupled with an upward move-away of the tail unit from the engine jet streams. For high-speed flight the tail unit-chassis with the tail surface is moved along the path of a circular arc forwards and downwards into the forward position 4a; l 5a or 4a; 9a; 10a, in which position the tail unit-chassis 4a is joined in an airflow suitable manner to the aft end of the fuselage. Into the front end of the upper cutout of the rear fuselage is horizontally inserted a cross-bond 20 consisting of two rods in X-shape. The cross-bond diagonally connects the left front end of the fuselage cutout with the right and rear fuselage side wall, and the right front end of the fuselage cutout with the left and rear fuselage side wall, penetrating the inner opening of the front swivel arm-frame, and increasing the torsional stiffness of the fuselage aft end. In the rear bottom side of the fuselage is provided a channel 16 attending to a smooth airflow.

Figure 7:
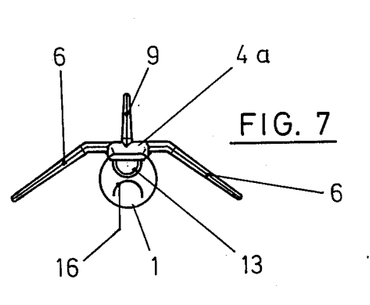
FIG. 7 shows the rear view of the aft end of the aircraft shown in FIG. 1 to FIG. 3 or FIG. 4 to FIG. 6 illustrating a travelling tail unit arranged as an inverted V-tail.
Figure 8:
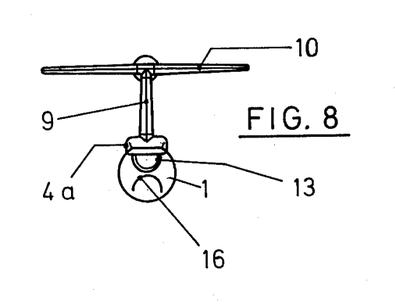
FIG. 8 shows the rear view of the aft end of the aircraft shown in FIG. 1 to FIG. 3 or FIG. 4 to FIG. 6 illustrating a travelling tail unit arranged as a T-tail.

Referring more particularly to FIG. 7 and FIG. 8, there are:
6. two inclined tail surfaces in an inverted V-tail arrangement; The remaining reference numerals are as specified above.

Besides the arrangements as a V-tail 5a; 5b or as a conventional tail with a vertical tail 9a; 9b and a horizontal tail 10a; 10b, l it is also provided to arrange the tail surfaces as an inverted V-tail 6, or as a T-tail 9; 10.

Figure 9:
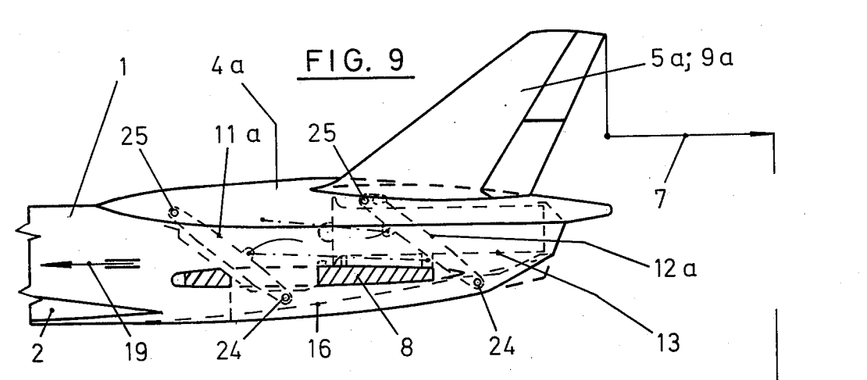
FIG. 9 shows the rear fragment of FIG. 2 or FIG. 5 with the travelling tail unit in its forward high-speed flight position.
Figure 10:
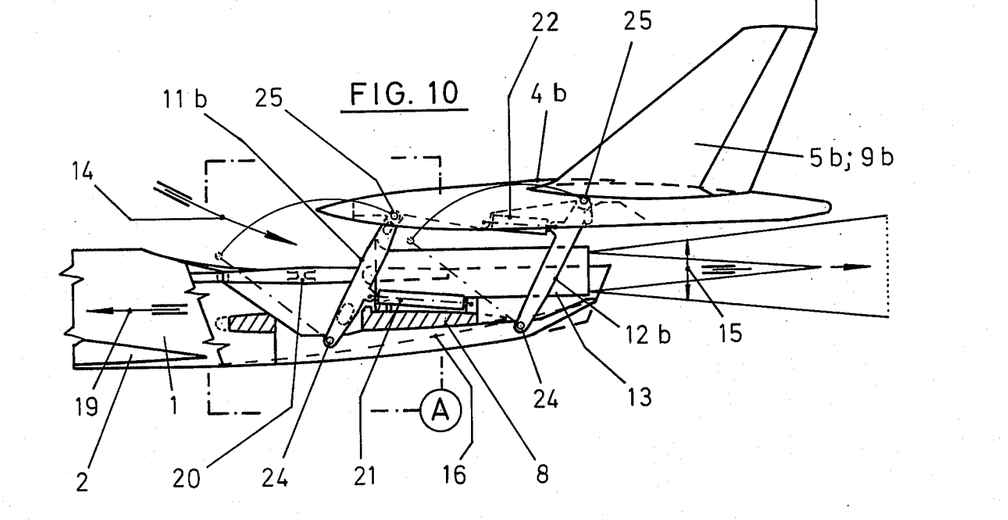
FIG. 10 shows the rear fragment of FIG. 2 or FIG. 5 with the travelling tail unit in its rearward low-speed flight position.

Referring more particularly to FIG. 9 and FIG. 10, there are:
8. crossbeam of the jet engines 3 (see FIG. 1);
14. air intake of the startbooster jet engine 13;
15. jet stream of the startbooster engine 13;
19. direction of flight;
21. actuator (hydraulical or electrical);
22. actuator (hydraulic or electrical); The remaining reference numerals are as specified above.

FIG. 9 shows the manner how the tail unit-chassis 4a faires the startbooster jet engine 13 during high-speed flight, with covered air intake and partially covered propelling nozzle. The startbooster jet engine 13 is accommodated inside of the aft end of the fuselage.

FIG. 10 shows the tail unit-chassis 4b moved along the path of a circular arc upwards and rearwards, which is accomplished by actuators 21 and/or 22. The tail unit-chassis 4b uncovers the air intake 14 and the propelling nozzle of the startbooster jet engine 13, which put into operation 15 increases the takeoff thrust or the zoom away thrust of the aircraft.

Figure 11:
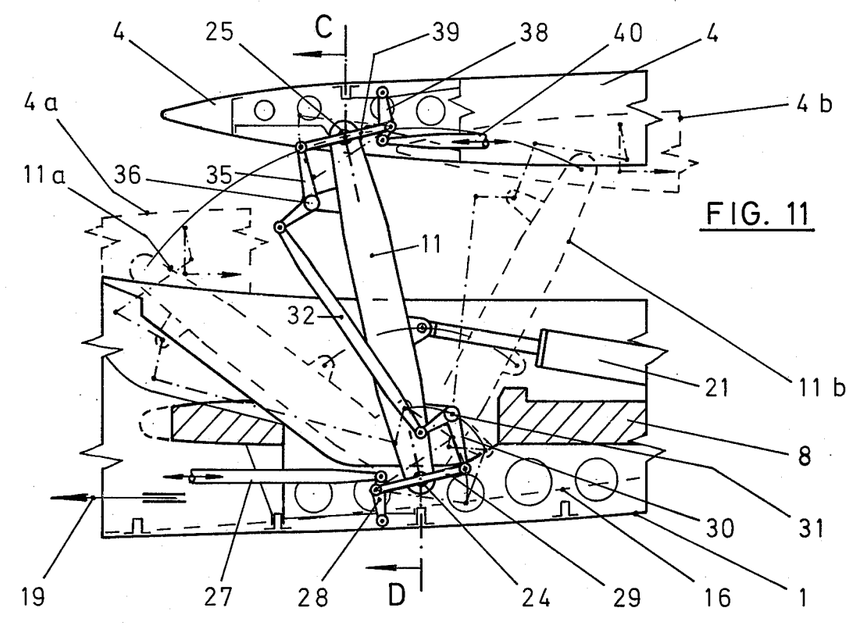
FIG. 11 shows the fragment "A" of FIG. 10, with the front swivel arm and the front end of the tail unit-chassis in the half-way position of their motion. The dash lines show said swivel arm and said tail unit-chassis in their forward and rearward positions. The dash-and-dot lines illustrate the central lines of the members of the control linkage(s) in their forward and rearward positions.
Figure 12:
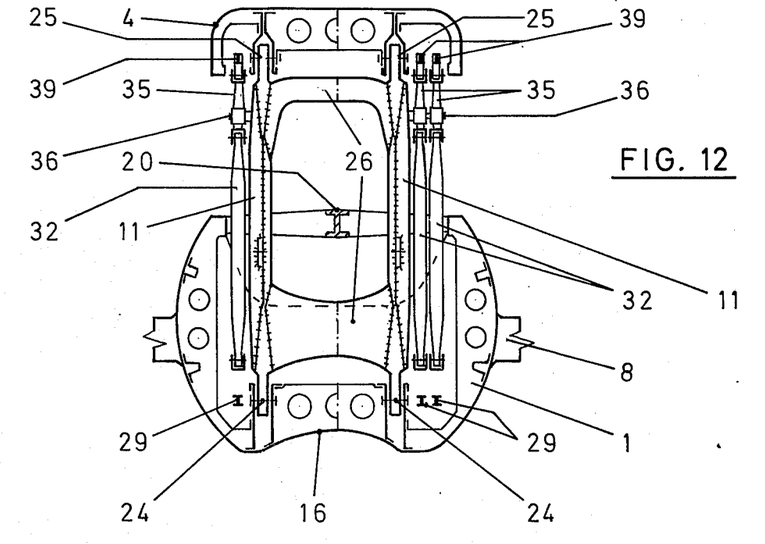
FIG. 12 is a section taken along lines C - D of FIG. 11, showing the swivel arm-frame, the control linkages, the cross-section of the rear fuselage, and the cross-section of the tail unit-chassis.

Referring more particularly to FIG. 11 and FIG. 12, there are:
26. crossbeams of the swivel arm-frames;
27. control rod from the flight control means;
28. lower twin-lever;
29. lower connecting rod;
30. lower angle lever;
31. pivot shaft for the lower angle lever, attached to the swivel arm;
32. intermediate rod;
35. upper angle lever;
36. pivot shaft for the upper angle lever, attached to the swivel arm;
38. upper twin-lever;
39. upper connecting rod;
40. control rod to the control surfaces; The remaining reference numerals are as specified above.

FIG. 12 shows the front swivel arm-frame consisting of the swivel arms 11, the crossbeams 26, and of brackets: two for the lower hinges 24, two for the upper hinges 25, two for the pivot shafts 31 (shown in FIG. 11), two for the pivot shafts 36, and two for the actuators 21.

FIG. 11 shows the same swivel arm-frame in the side elevational view. The not shown hind swivel arm-frame is of the same design.

The control linkages connecting the flight control means (control column and pedals of the pilot or the autopilot) with the control surfaces of the tail unit substantially have no travel deviations in the transmitted control commands during said rearward and forward motions of the tail unit. Each control linkage has two connecting rods 29 and 39 which in the half-way position of the swivel arm motion and in the half-way position of the control linkage motion substantially go through the fulcrum points of the swivel arm hinges 24 and 25, and both said connecting rods 29 and 39 stand at right angles to the longitudinal axis of the swivel arm 11 or 12, as shown in FIG. 11. Additionally, the lower connecting rod 29 stands at right angles to the adjacent and by joints attached members, which are at its one end the lower twin-lever 28 that is supported on the fuselage structure, and at its second end one member of the lower angle lever 30 that is supported on the swivel arm; the intermediate rod 32 stands at right angles to the adjacent and by joints attached members, which are at its one end the second member of the lower angle lever 30, and at its second end one member of the upper angle lever 35, and said both members are parallelly moved to each other in the course of the control linkage motions; the upper connecting rod 39 stands at right angles to the adjacent and by joints attached members, which are at its one end the second member of the upper angle lever 35 that is supported on the swivel arm, and at its second end the upper twin-lever 38 that is supported on the tail unit-chassis structure.

From this half-way positions of the swivel arm motion and control linkage motion, FIG. 11, both connecting rods 29 and 39 substantially symmetrically swing out towards both sides of the fulcrum points of the lower and upper hinges 24 and 25, when the swivel arm is moved into its forward 11a or rearward 11b positions, FIG. 11, because the connecting rods 29 and 39 in both cases connect members being on one side supported on the fuselage structure or on the tail unit-chassis structure, and on the other side supported on the movable swivel arm. Finally, the parallel connection between the two angle levers 30 and 35 – by the intermediate rod 32 – is important for the elimination of travel deviations in the transmitted control commands. The control linkages are positioned on the sides of the swivel arm-frames FIG. 12, with one or two control linkages on each frame side.

Figure 13:
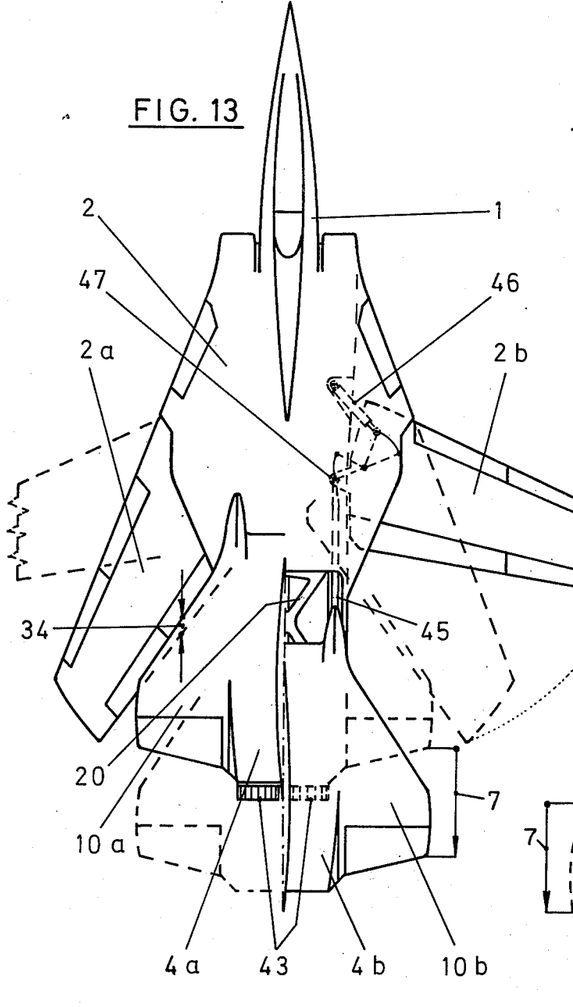
Figure 14:
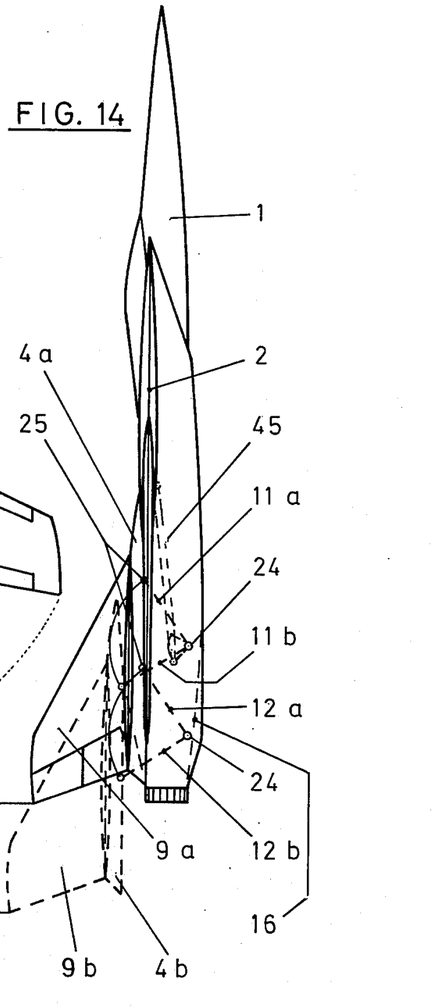

Referring more particularly to FIG. 13 and FIG. 14, there are:

2a. swinging outer wings in their high-speed flight position;

2b. swinging outer wings in their low-speed flight position;

34. leading edges of the horizontal tail 10a positioned in front of the trailing edges of the rearwards swung outer wings 2a, or positioned in front of the trailing edges of fixed wings;

43. jet engines;

45. connecting rod between the travelling tail unit and the variable geometry wings;

46. double function actuators for the swinging outer wings and the travelling tail unit;

47. brackets positioned on the roots of the swinging outer wings; The remaining reference numerals are as specified above.

The travelling tail unit consists of the tail unit-chassis 4a; 4b, the vertical tail 9a; 9b, and the horizontal tail 10a; 10b, which parts form a common monocoque construction. The tail unit-chassis is connected with the aft end of the fuselage by means of two front swivel arms 11, with the positions 11a and 11b, and two hind swivel arms 12, with the positions 12a and 12b; whilst the two front swivel arms are connected into a front swivel arm-frame, and the two hind swivel arms into a hind swivel arm-frame. For low-speed flight and particularly for takeoff and landing operations the tail unit is moved along the path of a circular arc upwards and rearwards into the rearward position 4b; 9b; 10b, which is coupled with an upward move-away of the tail unit from the engine jet streams. For high-speed flight the tail unit-chassis with the tail surfaces is moved along the path of a circular arc forwards and downwards into the forward position 4a; 9a; 10a, in which position the tail unit-chassis 4a is joined in an airflow suitable manner to the aft end of the fuselage.

Into the front end of the upper cutout of the rear fuselage is horizontally iinserted a cross-bond 20 consisting of two rods in X-shape. The cross-bond diagonally connects the left front end of the fuselage cutout with the right and rear fuselage side wall, and the right front end of the fuselage cutout with the left and rear fuselage side wall, penetrating the inner opening of the front swivel arm-frame, and increasing the torsional stiffness of the fuselage aft end. In the rear bottom side of the fuselage is provided a channel 16 attending to a smooth airflow.

The swinging outer wings 2a; 2b, are connected by means of connecting rods 45 with the front swivel arm-frame 11 (with positions 11a and 11b), which not only gives a common motion of both devices, but also reduces the common motion forces of them, because the rearward and forward motion forces of the tail unit, influenced by its air resistance, will widely be relieved by the air resistance forces of the swinging outer wings. In this combination the actuators 46 are moving both devices.

This description presents preferred embodiments of the invention. Alternations and modifications may occur to those skilled in the art which are included within the scope of the following claims.

What I claim is:

1. An aircraft having a travelling tail unit which is movable in longitudinal direction of aircraft by means of circular arc motions comprising:

a fuselage (1), a pair of fixed wings (2) with ailerons, landing flaps, slats, jet engines (3; 23; 33) mounted on said aircraft, a startbooster jet engine (13) accommodated inside of the aft end of said fuselage, a tail unit being composed of a tail unit-chassis (4a; 4b) having a longitudinal and airflow suitable shape and at least two tail surfaces, the parts of said tail unit forming a common monocoque construction,.

a. the said tail unit being substantially moved along the path of a circular arc upwards and rearwards into the rearward position increasing the effective tail unit lever for low-speed flight and particularly for takeoff and landing operations, b. the said tail unit being substantially moved along the path of a circular arc forwards and downwards into the forward position for high-speed flight, c. the said tail unit in its forward high-speed flight position being placed in a horizontal distance behind the trailing edges of said wings, from which forward position the said tail unit is moved rearwards into the position for low-speed flight and vice versa (FIG. 1; FIG. 2; FIG. 4 and FIG. 5), d. the said tail unit-chassis being connected with the aft end of said fuselage by means of two front swivel arms (11 with positions 11a and 11b) and two hind swivel arms (12 with positions 12a and 12b), e. the said two front swivel arms (11) being with each other connected by means of crossbeams (26) into a front swivel arm-frame (FIG. 12), and the said two hind swivel arms (12) being with each other connected by means of crossbeams (26) into a hind swivel arm-frame (analogous to FIG. 12), both said frames having rigid frame corners, f. the said swivel arm-frames lying with their frame planes substantially transversally to the direction of flight, g. the said swivel arm-frames having hinges on their corners, particularly each said swivel arm-frame having two lower hinges (24) on its two lower corners connecting said swivel arm-frame with the aft end of said fuselage and two upper hinges (25) on its two upper corners connecting said swivel arm-frame with said tail unit-chassis (FIG. 2; FIG. 5 and FIG. 9 to FIG. 12), h. the said tail unit-chassis in its forward high-speed flight position (4a) being joined in an airflow suitable manner to said aft end of said fuselage, i. the said tail unit-chassis in its forward high-speed flight position (4a) being used as an airflow suitable fairing for said startbooster jet engine (13) when it is stopped during high-speed flight (FIG. 2; FIG. 3 and FIG. 5 to FIG. 9), whereas said tail unit-chasses moved into its rearward low-speed flight position (4b) uncovers the air intake (14) and propelling nozzle of said startbooster jet engine, which put into operation (15) increases the takeoff thrust or the zoom away thrust of the aircraft (FIG. 10), increases the propulsion redundancy, makes the design of the main jet engines simpler, especially for supersonic aircraft, and being specially adpated to zero altitude conditions, reduces the fuel consumption, and makes the exhaust emissions on airfields cleaner, j. the said tail unit being moved rearwards and forwards by means of actuators (21 and 22) coupled with at least one of said swivel arm-frames (FIG. 10 and FIG. 11), k. the said tail unit having control linkages continuously connecting the flight control means with the contol surfaces of said tail unit (FIG. 11 and FIG. 12), and each said control linkage is transmitting a separate control command to a separate control surface, l. the said startbooster jet engine (13) having its air intake through the inner opening of said front swivel arm-frame, and its propelling nozzle positioned inside of the inner opening of said hind swivel arm-frame (FIG. 9 and FIG. 10), m. the said tail unit arrangement having a crossbond (20) consisting of two rods in X-shape and being horizontally inserted into the front end of the upper cutout of the rear fuselage, diagonally connecting the left front end of the fuselage cutout with the right and rear fuselage side wall, and the right front end of the fuselage cutout with the left and rear fuselage side wall, penetrating the inner opening of said front swivel arm-frame (FIG. 1; FIG. 4; FIG. 10 and FIG. 12), whilst said crossbond is increasing the torsional stiffness of said fuselage aft end, n. the said fuselage (1) having a channel (16) in its rear bottom side.

2. The aircraft of claim 1 wherein each of said control linkages connecting the flight control means with the control surfaces of said tail unit (FIG. 11 and FIG. 12) is composed of the control rod from the flight control means (27), the lower twin-lever (28), the lower connecting rod (29), the lower angle lever (30), the pivot shaft for the lower angle lever (31), attached to the swivel arm, the intermediate rod (32), the upper angle lever (35), the pivot shaft for the upper angle lever (36), attached to the swivel arm, the upper connecting rod (39), the upper twin-lever (38), and the control rod to the control surface (40), whilst said control linkage is so designed that in the half-way position of said swivel arm motion and in the half-way position of the control linkage motion (as shown in FIG. 11 and FIG. 12) said lower connecting rod (29) substantially goes through the fulcrum point of said lower hinges (24) of said swivel arms, and said upper connecting rod (39) substantially goes through the fullcrum point of said upper hinges (25) of said swivel arms, as well as both said connecting rods (29 and 39) substantially stand at right angles to the longitudinal axes of said swivel arms (11 or 12), and in these half-way positions of said swivel arm motion and said control linkage motion said lower connecting rod (29) substantially stands at right angles to the adjacent and by joints attached members, which are at its one end a member of said lower twin-lever (28) that is supported on the fuselage structure, and at its second end one member of said lower angle lever (30) that is supported on said swivel arm, said intermediate rod (32) substantially stands at right angles to the adjacent and by joints attached members, which are at its one end the second member of said lower angle lever (30), and at its second end one member of said upper angle lever (35), and said both members are substantially parallelly moved to each other in the course of said control linkage motions, said upper connecting rod (39) substantially stands at right angles to the adjacent and by joints attached members, which are at its one end the second member of said upper angle lever (35) that is supported on the swivel arm, and at its second end a member of said upper twin-lever (38) that is supported on the structure of said tail unit-chassis, whereat both said connecting rods (29 and 39) substantially symmetrically swing out towards both sides of said fulcrum points of said lower and upper swivel arm hinges (24 and 25) when said swivel arms are moved into their rearward or forward positions (FIG. 11), by which design said control linkages substantially have no travel deviations in the transmitted control commands during said rearward and forward motions of said tail unit, and said control linkages are positioned on the sides of said swivel arm-frames (FIG. 12), at least one said control linkage on each side of said swivel arm-frame.

3. The aircraft of claim 1 wherein said tail surfaces are arranged as an inverted V-tail (6) (FIG. 7).

4. The aircraft of claim 1 wherein said travelling tail surfaces have smaller dimensions than fixed tail surfaces of conventional aircraft, which reduces the air resistance during highspeed flight and saves propulsion energy.

5. The aircraft of claim 1 wherein said tail unit in the course of its rearward movement is getting a continuously increasing positive angle of incidence in relation to the local streamline direction to produce additional lift during low-speed flight, which is accomplished by a corresponding kinematical design of said swivel arms, for instance by a shorter horizontal (i.e. longitudinal) distance between the two said lower hinges (24) of said swivel arms than the horizontal distance between the two said upper hinges (25), and which positive angle of incidence is continuously turned back in the course of the forward movement of said tail unit, likewise resulting from said kinematical design of said swivel arms.

6. The aircraft of claim 1 wherein said upward and rearward motion of said tail unit for low-speed flight is coupled with an upward move-away of said tail unit from the engine jet streams.

7. The aircraft of claim 1 having subsonic flight capabilities (FIG. 1; FIG. 2 and FIG. 3).

8. The aircraft of claim 1 having transsonic flight capabilities.

9. The aircraft of claim 1 having supersonic flight capabilities (FIG. 4; FIG. 5 and FIG. 6).

10. The aircraft of claim 1 wherein said tail surfaces (5a; 5b) are arranged as a V-tail (FIG. 1; FIG. 2; FIG. 3; FIG. 9 and FIG. 10).

11. The aircraft of claim 1 wherein said tail surfaces are arranged as a conventional tail with a vertical tail (9a; 9b) and a horizontal tail (10a; 10b)(FIG. 4; FIG. 5; FIG. 6 and FIG. 8).

12. The aircraft of claim 1 wherein said tail surfaces are arranged as a T-tail (FIG. 8).

13. An aircraft having a travelling tail unit which is movable in longitudinal direction of aircraft by means of circular arc motions comprising:

a pair of variable geometry wings (FIG. 13 and FIG. 14) consisting of a fixed middle wing (2) and two swinging outer wings (2a; 2b), a fuselage (1) positioned substantially on the bottom side of said fixed middle wing, with two lateral engine intake tunnels and with two jet engines positioned in the aft end of said fuselage, a tail unit being composed of a tail unit-chassis (4a; 4b) having a longitudinal and airflow suitable shape, a vertical tail (9a; 9b), and a horizontal tail (10a; 10b), said parts forming a common monocoque construction,   a. the said tail unit being substantially moved along the path of a circular arc upwards and rearwards into the rearward position (4b; 9b; 10b) increasing the effective tail unit level for low-speed flight and particularly for takeoff and landing operations,   b. the said tail unit being substantially moved along the path of a circular arc forwards and downwards into the forward position (4a; 9a; 10a) for high-speed flight,   c. the said horizontal tail in its forward high-speed flight position (10a) being placed in a plane lying above the planes of said wings, and being so much moved forwards that the leading edges of said horizontal tail (10a) are positioned in front of the trailing edges (34) of said rearwards swung outer wings (2a), whereby the supersonic impact wave resistance of said aerodynamically cooperating wings and horizontal tail is reduced,   d. the said tail unit-chassis being connected with the aft end of said fuselage by means of two front swivel arms (11 with positions 11a and 11b) and two hind swivel arms (12 with positions 12a and 12b),   e. the said two front swivel arms (11) being with each other connected by means of cross beams (26) into a front swivel arm-frame (FIG. 12), and the said two hind swivel arms (12) being with each other connected by means of cross beams (26) into a hind swivel arm-frame (analogous to FIG. 12), both said frames having rigid frame corners,   f. the said swivel arm-frames lying with their frame planes substantially transversally to the direction of flight, the said swivel arm-frames having hinges on their corners, particularly each said swivel arm-frame having two lower hinges (24) on its two lower corners connecting said swivel arm-frame with the aft end of said fuselage, and two upper hinges (25) on its two upper corners connecting said swivel arm-frame with said tail unit-chassis (FIG. 11; FIG. 12 and FIG. 14),   h. the said tail unit-chassis in its forward high-speed flight position (4a) being joined in an airflow suitable manner to said aft end of said fuselage, the said tail unit being moved rearwards and forwards by means of actuators which are double function actuators used for the motions of said tail unit and for the swinging motions of said outer wings (2a; 2b) and which are coupled with at least the roots of said swinging outer wings (46)(FIG. 13), whilst said swinging wings are connected with said tail unit by means of connecting rods (45) which are fitted with spherical joints between the brackets (47) - positioned on the roots of said swinging outer wings - and the said front swivel arm-frame (11, with positions 11a and 11b)(FIG. 13 and FIG. 14), by which connection the rearward and forward motion forces of said tail unit influenced by its air resistance will widely be relieved by the air resistance forces of said swinging outer wings, which reduces the common motion forces of both devices,   j. the said tail unit having control linkages continuously connecting the flight control means with the control surfaces of said tail unit (FIG. 11 and FIG. 12), and each said control linkage is transmitting a separate control command to a separate control surface,   k. the said tail unit arrangement having a cross-bond (20) consisting of two rods in X-shape and being horizontally inserted into the front end of the upper cutout of the rear fuselage, diagonally connecting the left front end of the fuselage cutout with the right and rear fuselage side wall, and the right front end of the fuselage cutout with the left and rear fuselage side wall, penetrating the inner opening of said front swivel arm-frame (FIG. 12; FIG. 13 and FIG. 14), whilst said cross-bond is increasing the torsional stiffness of said fuselage aft end,   l. the said fuselage (1) having a channel (16) in its rear bottom side.

14. The aircraft of claim 13 wherein each of said control linkages connecting the flight control means with the control surfaces of said tail unit (FIG. 11 and FIG. 12) is composed of the control rod from the flight control means (27), the lower twin-lever (28), the lower connecting rod (29), the lower angle lever (30), the pivot shaft for the lower angle lever (31), attached to the swivel arm, the intermediate rod (32), the upper angle lever (35), the pivot shaft for the upper angle lever (36), attached to the swivel arm, the upper connecting rod (39), the upper twin-level (38), and the control rod to the control surface (40), whilst said control linkage is so designed that in the half-way position of said swivel arm motion and in the half-way position of the control linkage motion (as shown in FIG. 11 and FIG. 12) said lower connecting rod (29) substantially goes through the fulcrum point of said lower hinges (24) of said swivel arms, and said upper connecting rod (39) substantially goes through the fulcrum point of said upper hinges (25) of said swivel arms, as well as both said connecting rods (29 and 39) substantially stand at right angles to the longitudinal axes of said swivel arms (11 or 12), and in these half-way positions of said swivel arm motion and said control linkage motion said lower connecting rod (29) substantially stands at right angles to the adjacent and by joints attached members, which are at its one end a member of said lower twin-level (28) that is supported on the fuselage structure, and at its second end one member of said lower angle lever (30) that is supported on said swivel arm, said intermediate rod (32) substantially stands at right angles to the adjacent and by joints attached members, which are at its one end the second member of said lower angle lever (30), and at its second end one member of said upper angle lever (35), and said both members are substantially parallelly moved to each other in the course of said control linkage motions, said upper connecting rod (39) substantially stands at right angles to the adjacent and by joints attached members, which are at its one end the second member of said upper angle lever (35) that is supported on said swivel arm, and at its second end a member of said upper twin-lever (38) that is supported on the structure of said tail unit-chassis, whereat both said connecting rods (29 and 39) substantially symmetrically swing out towards both sides of said fulcrum points of said lower and upper swivel arm hinges (24 and 25) when said swivel arms are moved into their rearward or forward positions (FIG. 11), by which design said control linkages substantially have no travel deviations in the transmitted control commands during said rearward and forward motions of said tail unit, and said control linkages are positioned on the sides of said swivel arm-frames (FIG. 12), at least one said control linkage on each side of said swivel arm-frame.

15. The aircraft of claim 13 wherein said tail unit in the course of its rearward motion is getting a continuously increasing positive angle of incidence in relation to the local streamline direction to produce additional lift during low-speed flight, which is accomplished by a corresponding kinematical design of said swivel arms, for instance by a shorter horizontal (i.e. longitudinal) distance between the two said lower hinges (24) of said swivel arms than the horizontal distance between the two said upper hinges (25), and which positive angle of incidence is continuously turned back in the course of the forward motion of said tail unit, likewise resulting from said kinematical design of said swivel arms.

16. The aircraft of claim 13 wherein said upward and rearward motion of said tail unit for low-speed flight is coupled with an upward move-away of said tail unit from the engine jet streams.

17. An aircraft having a travelling tail unit which is movable in longitudinal direction of aircraft by means of circular arc motions comprising:
   a fuselage,
   a pair of fixed wings with ailerons, landing flaps, slats, jet engines mounted on said aircraft,
   a startbooster jet engine accommodated inside of the aft end of said fuselage,
   a tail unit being composed of a tail unit-chassis having a longitudinal and airflow suitable shape, a vertical tail, and a horizontal tail arranged as an inverted V-tail (like FIG. 7),
   a. the said tail unit being substantially moved along the path of a circular arc upwards and rearwards into the rearward position increasing the effective tail unit lever for low-speed flight and particularly for takeoff and landing operations,
   b. the said tail unit being substantially moved along the path of a circular arc forwards and downwards into the forward position for high-speed flight,
   c. the said horizontal tail in its forward highspeed flight position being placed above the planes of said wings, and being so much moved forwards that the leading edges of said horizontal tail are positioned in front of the trailing edges of said fixed wings, whereby the supersonic impact wave resistance of the aerodynamically cooperating horizontal tail and wings is reduced,
   d. the said tail unit-chassis being connected with the aft end of said fuselage by means of two front swivel arms (11 with positions 11a and 11b) and two hind swivel arms (12 with positions 12a and 12b)(FIG. 9 to FIG. 12),
   e. the said two front swivel arms (11) being with each other connected by means of crossbeams (26) into a front swivel arm-frame (FIG. 12), and the said two hind swivel arms (12) being with each other connected by means of crossbeams (26) into a hind swivel arm-frame (analogous to FIG. 12), both said frames having rigid frame corners,
   f. the said swivel arm-frames lying with their frame planes substantially transversally to the direction of flight,
   g. the said swivel arm-frames having hinges on their corners, particularly each said swivel arm-frame having two lower hinges (24) on its two lower corners connecting said swivel arm-frame with the aft end of said fuselage and two upper hinges (25) on its two upper corners connecting said swivel arm-frame with said tail unit-chassis (FIG. 9 to FIG. 12),
   h. the said tail unit-chassis in its forward high-speed flight position (4a) being joined in an airflow suitable manner to said aft end of said fuselage,
   i. the said tail unit-chassis in its forward high-speed flight position being used as an airflow suitable fairing for said startbooster jet engine (13) when it is stopped during high-speed flight (FIG. 7 to FIG. 9), whereas said tail unit-chassis moved into its rearward low-speed flight position (4b) uncovers the air intake (14) and propelling nozzle of said startbooster jet engine, which put into operation (15) increases the takeoff thrust or the zoom away thrust of the aircraft (FIG. 10), increases the propulsion redundancy, makes the design of the main jet engines simpler, especially for supersonic aircraft, and being specially adapted to zero altitude conditions, reduces the fuel consumption, and makes the exhaust emissions on airfields cleaner,
   j. the said tail unit being moved rearwards and forwards by means of actuators (21 and 22) coupled with at least one of said swivel arm-frames (FIG. 10 and FIG. 11),
   k. the said tail unit getting in the course of its rearward motion a continuously increasing positive angle of incidence in relation to the local streamline direction to produce additional lift during low-speed flight, which is accomplished by a corresponding kinematical design of said swivel arms, and which positive angle of incidence is continuously turned back in the course of the forward motion of said tail unit,
   l. the said tail unit having control linkages continuously connecting the flight control means with the control surfaces of said tail unit (FIG. 11 and FIG. 12), and each said control linkage is transmitting a separate control command to a separate control surface,
   m. the said startbooster jet engine (13) having its air intake through the inner opening of said front swivel arm-frame, and its propelling nozzle positioned inside of the inner opening of said hind swivel arm-frame (FIG. 9 and FIG. 10),
   n. the said tail unit arrangement having a crossbond (20) consisting of two rods in X-shape and being horizontally inserted into the front end of the upper cutout of the rear fuselage, diagonally connecting the left front end of the fuselage cutout with the right and rear fuselage side wall, and the right front end of the fuselage cutout with the left and rear fuselage side wall, penetrating the inner opening of said front swivel arm-frame (FIG. 10 and FIG. 12), whilst said cross-bond is increasing the torsional stiffness of said fuselage aft end,
   o. the said fuselage having a channel (16) in its rear bottom side.

* * * * *